United States Patent Office

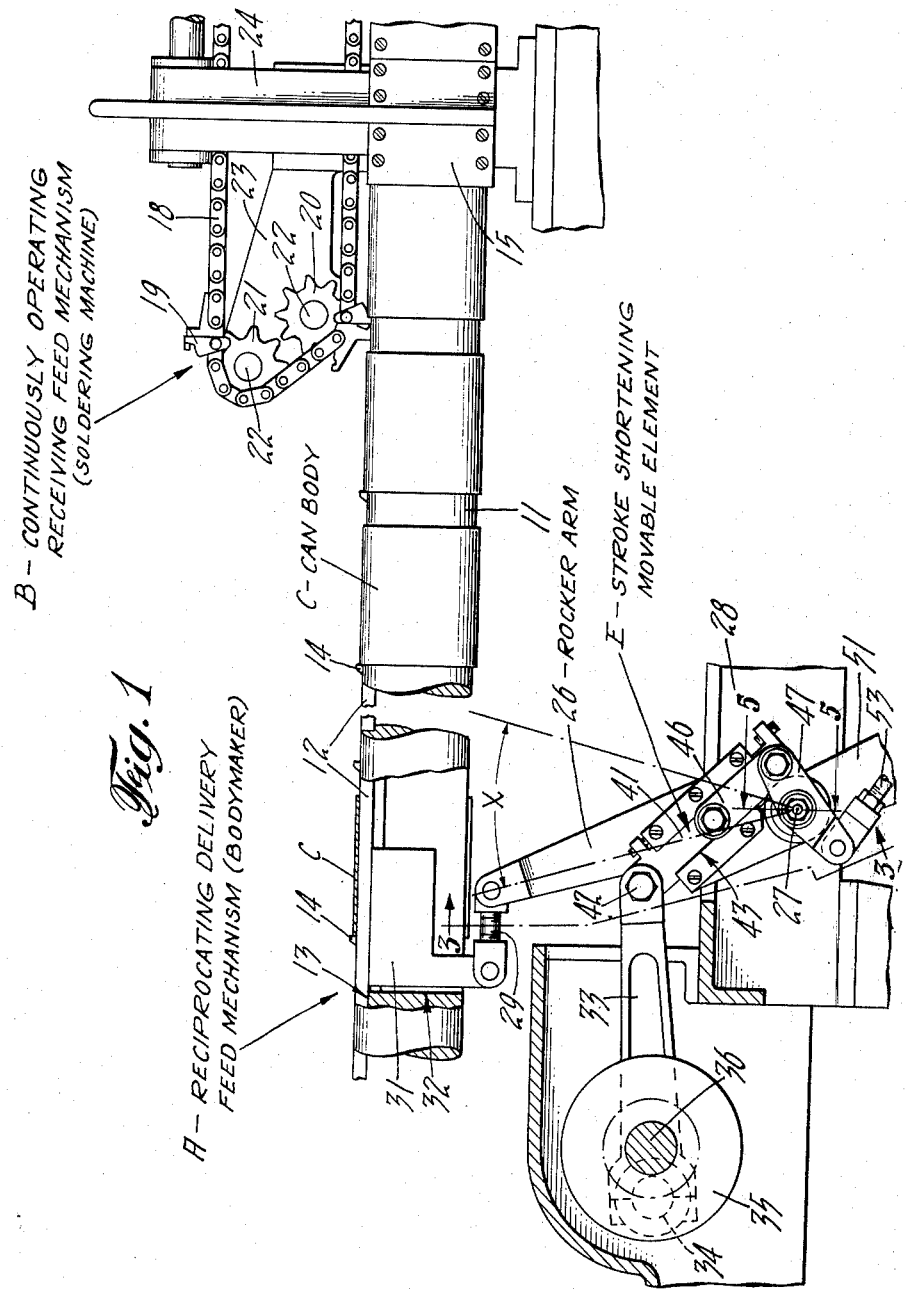

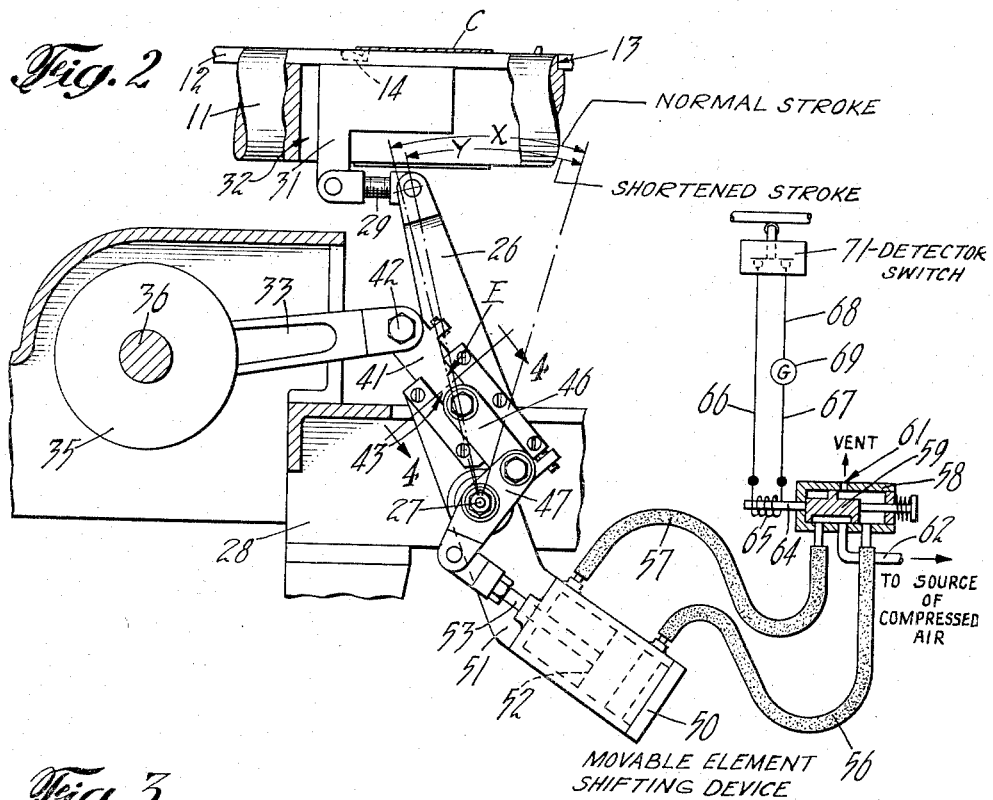
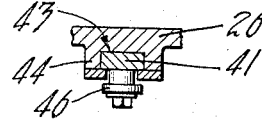
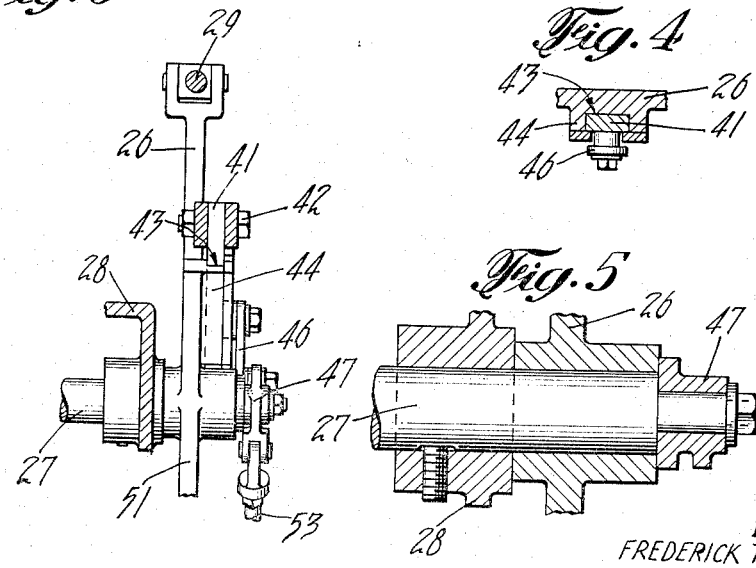
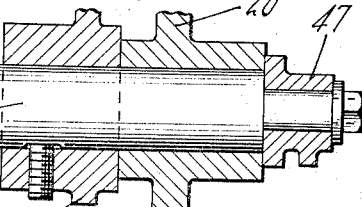

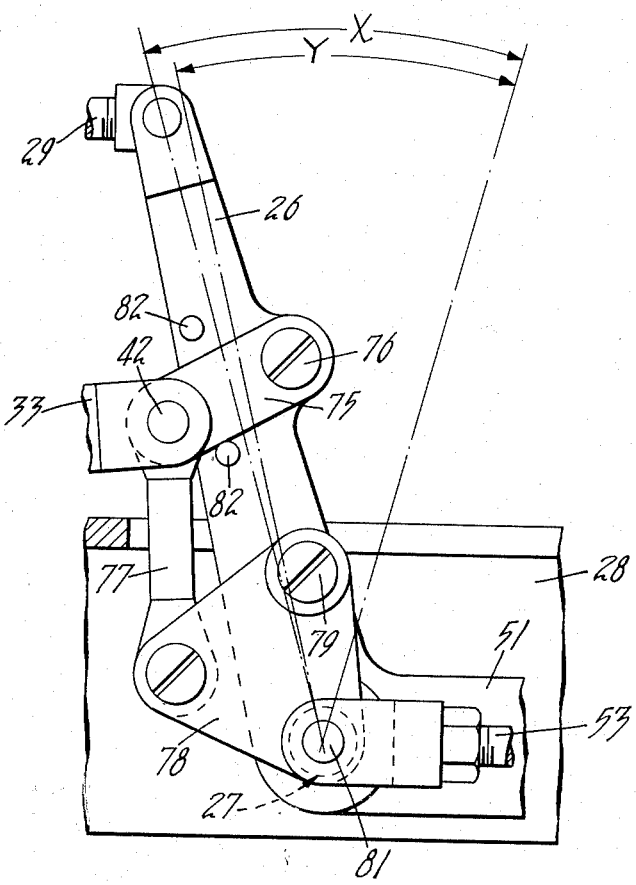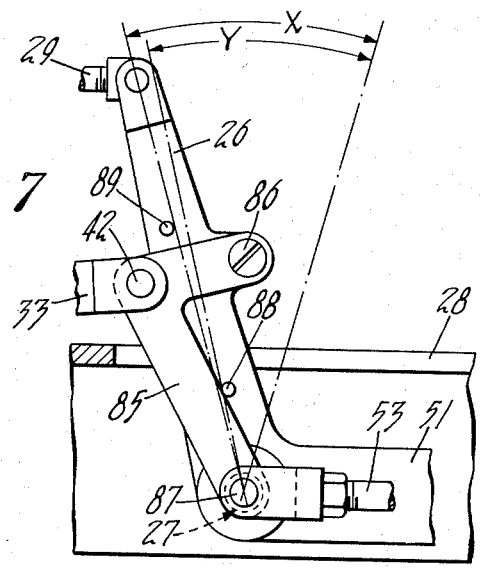

2,926,774
Patented Mar. 1, 1960

2,926,774

MECHANISM FOR CONTROLLING ADVANCEMENT OF BODIES IN CAN BODYMAKER

Frederick T. Oppermann, San Carlos, Calif., assignor to American Can Company, New York, N.Y., a corporation of New Jersey Application September 10, 1957, Serial No. 683,055

14 Claims. (Cl. 198—232)

The present invention relates to machines in which articles are advanced from an intermittently operating section to a continuously operating section as in the advancement of can or container bodies from a body making machine to a soldering machine or the like and has particular reference to mechanism for stopping the advancement of the articles from the intermittently operating section into the continuously operating section when a jam occurs.

In the manufacture of sheet metal can bodies which require a side seam soldering operation it is customary to form the body in a forming section of a can body making machine and to effect the soldering operation in a soldering section. These two sections are connected by an extension of the forming mandrel of the forming section of the machine. The bodies, as they are formed, are propelled along the mandrel by feeding devices usually a stroke bar having feed dogs which advance the bodies in timed order and deliver them into a feeding device of the soldering section of the machine.

The soldering of the can bodies involves high heat and because of this, the soldering section is a continuously operating mechanism, while the forming section is subject to frequent stops by reason of jams and other abnormal causes. When the forming section stops, it leaves the most advanced can body on the mandrel in an indeterminate position which usually is a partially advanced position improperly placed relative to the receiving mechanism of the soldering machine section where it is liable to be wrecked and to cause damage to the receiving mechanism of the machine. This condition usually is aggravated by the fact that the bodymaker is a rather heavy machine and cannot be stopped instantly. Usually three or four cycles of the machine takes place after a jam, before the machine completely stops, with the result that three or four can bodies are improperly fed to the receiving mechanism of the soldering machine to create a second jam and complicate matters in the soldering machine.

The instant invention contemplates overcoming this difficulty by the provision of a mechanism which upon occurrence of a jam, immediately shortens the stroke of the feed bar in the bodymaker so that upon the first return stroke of the feed bar, after a jam, and after the feed bar has properly positioned the leading can body, the feed dogs on the bar become ineffective on the other bodies in the procession and thus prevent their advancement into improper positions relative to the continuously operating section of the machine. This permits of letting the machine stop gradually instead of trying to stop it suddenly.

Therefore, an object of the instant invention is to overcome the above mentioned difficulty by the provision of mechanism which controls the advancement of the can bodies from the bodymaker to insure full advancement of the last (leading) can body, i.e. the body immediately adjacent the soldering machine, into proper position in the soldering machine receiving devices, when a jam occurs in the bodymaker.

Another object is to stop this advancement of the can bodies from the bodymaker at a predetermined time in the cycle of operation of the machine, i.e. at the termination of a feeding operation so as to leave the bodies interposed between the bodymaker and the soldering machine in proper location for proper advancement immediately upon resumption of operation of the bodymaker.

Another object is to make the bodymaker feeding devices ineffective upon the can bodies immediately following a jam in the bodymaker, without suddenly stopping the feeding devices so as to eliminate stopping strains on the bodymaker parts and to compensate for improper advancement of the bodies through slowing down of the machine parts while stopping.

Numerous other objects and advantages of the invention will be apparent as it is better understood from the following description, which, taken in connection with the accompanying drawings, discloses a preferred embodiment thereof.

Referring to the drawings:

Figure 1 is a side elevation of principal parts of a can body making machine embodying the instant invention, with parts broken away and the view also showing a procession of can bodies passing through the machine;

Fig. 2 is a fragmentary sectional view of the portion of the machine shown at the left in Fig. 1, the view showing certain of the parts in a different position and also to illustrate fluid actuating devices and a wiring diagram of the electrical parts in the machine;

Fig. 3 is a sectional view taken substantially along the broken line 3—3 in Fig. 1, with parts broken away;

Fig. 4 is a sectional view taken substantially along the line 4—4 in Fig. 2, with parts broken away;

Fig. 5 is a sectional view taken substantially along the line 5—5 in Fig. 1, with parts broken away; and Figs. 6 and 7 are enlarged fragmentary elevational views of modified forms of certain parts of the mechanism shown at the left in Fig. 1.

As a preferred and exemplary embodiment of the instant invention the drawings illustrate principal parts of a delivery feed mechanism of a forming section A (Fig. 1) of a can body making machine and a receiving mechanism of a soldering section B of a side seam soldering machine customarily used with the bodymaker as a unitary extension thereof to provide for complete manufacture of can bodies C. These machines are of the character respectively disclosed in United States Patent 1,770,041 issued July 8, 1930 to John F. Peters on Roll Bodymaker and United States Patent 1,338,716 issued May 4, 1920 to M. E. Widell on Soldering Machine.

In such a can body making and soldering machine the can bodies C are properly shaped and prepared for soldering during advancement along an inside mandrel or horn 11 (Fig. 1) which forms a part of the forming section A of the bodymaking machine. Advancement of the bodies along the horn 11 is effected in an intermittent or step-by-step manner, preferably by a reciprocating stroke or feed bar 12 located in a longitudinal groove 13 in the mandrel 11. The feed bar 12 is provided with spaced depressible feed dogs 14 for engagement behind the can bodies. These feed dogs 14 are spring pressed and are retractable within the feed bar upon contact with the leading edges of the bodies when the feed bar reciprocates back through a return stroke so that the bodies will remain in their advanced position. This is a conventional bodymaker structure.

The mandrel 11 extends beyond the forming section A of the bodymaker and connects with the receiving or entrance end of an outside horse 15 (Fig. 1) which is a part of the soldering machine B and which provides for continued guidance of the bodies C through the soldering machine. The bodies C are propelled through this outside horse 15 by a continuously moving endless chain conveyor 18 having gripper dogs 19 spaced at equal intervals along the chain and which travel along the top of the horse.

At the receiving end of the horse 15 the conveyor 18 operates over a pair of vertically spaced idler sprockets 20, 21 mounted on shafts 22 journaled in a bearing bracket 23 which extends out from a frame 24 which consitutes the main frame of the soldering machine B. The conveyor 18 is continuously operated in any suitable manner, preferably by connection with the bodymaker A as disclosed in the above mentioned Widell patent, so that the conveyor operates in timed relation with the bodymaker.

The can bodies C produced in the forming section A of the bodymaker, as they are advanced in a step-by-step manner along the mandrel 11 by the reciprocating feed bar 12 are continued in this advancement along the extension of the mandrel 11 to a transfer station at the entrance end of the soldering machine conveyor 18 for transfer thereto and continued advancement through the outside horse 15. For this purpose the feed bar 12 is reciprocated through a feeding stroke toward the soldering machine conveyor 18 and thence through a back or return stroke in time with the advancement of the gripper dogs 19 on the conveyor 18.

This reciprocating movement of the feed bar 12 is effected by a rocker arm 26 (Figs. 1, 3 and 5) which is loosely mounted on a stationary pivot pin 27 carried in a frame 28 which constitutes the main frame of the bodymaker A. The arm 26 extends upwardly and at its upper end is pivotally connected by a short link 29 to a bracket 31 attached to the feed bar 12. The bracket 31 operates in a clearance opening 32 in the mandrel 11.

The rocker arm 26 is oscillated on its pivot pin 27 by a pitman 33 which at one end is connected to a crank pin 34 secured in a pair of spaced crank discs 35 on a crank shaft 36 extending transversely of the bodymaker and journaled in suitable bearings formed in the bodymaker frame 28.

In the conventional bodymaker, the opposite end of the pitman 33 is connected directly to the rocker arm 26 at a predetermined point intermediate the ends of the rocker arm so as to effect a normal angular stroke X (Fig. 1) of the arm sufficient to advance and return the feed bar 12 a distance equal to the length of a can body plus the space between adjacent bodies. This angular oscillation of the rocker arm provides for advancing each can body its proper distance for proper entry into the soldering machine conveyor 18.

In the instant invention, this end of the pitman 33 (Fig. 1) is connected to a movable element E which is carried by the rocker arm 26 and which is shifted or moved along the length of the rocker arm when a jam occurs in the bodymaker, for the purpose of shortening the normal angular stroke X of the rocker arm 26 to a reduced return stroke Y (Fig. 2) to thereby shorten the return stroke and the following strokes of the feed bar 12 until the bodymaker stops. Thus upon the occurrence of a jam in the bodymaker, the shortening of the angular stroke of the rocker arm 26 has the effect of permitting the stroke bar 12 to complete its forward or feeding stroke to properly position in the soldering machine conveyor 18, the advancing can body immediately adjacent thereto, and to return the feed bar through its shortened stroke, so that the feed dogs 14 will be prevented from travelling through their full return stroke and as a result will be held in a depressed position under the can bodies as shown in Fig. 2 so that they cannot snap up behind the bodies. This results in the can bodies remaining stationary on the mandrel 11 while the feed bar 12 continues to reciprocate through its forward and shortened return strokes until the gradually stopping bodymaker slows to a complete standstill.

In the preferred form of the invention, the movable member E is a slide 41 (Figs. 1 and 3) which is disposed laterally parallel with but axially at a slight angle to the rocker arm 26 and to which slide the pitman 33 is connected by a pivot screw 42 at the upper end of the slide. The slide 41 operates in a slideway 43 (see also Figs. 3 and 4) formed in a boss 44 which projects laterally from the rocker arm 26.

The slide 41 is pivotally connected by a link 46 to one end of an actuating lever 47 which intermediate its ends is rotatably carried on the fixed or stationary pivot pin 27 (see also Fig. 5). The opposite end of the lever 47 is connected to a suitable device for rocking the lever when a jam occurs in the bodymaker. The normal position of the lever 47 and the slide 41 relative to the rocker arm 26 is shown in Fig. 1. In this position of the slide 41, the distance between the pivot screw 42 and the axis of the pivot pin 27 is such as to produce the normal angular stroke X of the rocker arm. When the actuating lever 47 is rocked in a counterclockwise direction into the position shown in Fig. 2, the slide 41 and the pivot screw 42 secured therein moves further away from the pivot pin 27 and thereby lengthens the distance between the pivot screw 42 and the axis of the pivot pin 27. It is this movement of the pivot screw 42 that shortens the angular stroke of the rocker arm 26 and thereby shortens the stroke of the feed bar 12.

Rocking of the actuating lever 47 out of and back into its normal position preferably is effected by an air cylinder 50 which is mounted on a bracket 51 (Figs. 2 and 3) which is an extension of and moves with the rocker arm 26. The cylinder 50 contains a piston 52 having a piston rod 53 connected to the actuating lever 47. Reciprocation of the piston 52 in its cylinder 50 at the proper time preferably is effected by compressed air introduced alternately into the ends of the cylinder by way of tubes 56, 57 which connect with opposite ends of a housing 58 containing a spring loaded slide valve 59 controlling communication between the tubes 56, 57 and a vent 61 and a main air supply pipe 62 which leads to any suitable source of supply of compressed air.

The slide valve 59 is provided with a stem 64 which extends beyond the housing 58 and serves as a movable core for a normally deenergized electric solenoid 65 connected by wires 66, 67, 68 to a suitable source 69 of electric current and to one or more normally open electric detector switches 71 located at places where jams occur in the bodymaker and closable by can bodies in such jams, as shown in Fig. 2 to establish the circuit and thereby permit actuation of the actuating lever 47 as hereinbefore described to shorten the normal stroke of the feed bar 12.

Shortening the normal angular stroke X of the rocker arm 26 may be effected in many other ways such as for example by modified constructions shown in Figs. 6 and 7. In Fig. 6, the pivot screw 42 of the pitman 33 is secured to a short link 75 of a parallelogram link device, the link 75 being pivotally attached by a screw 76 to the rocker arm 26. The pivot screw 42 is also connected to a link 77 which extends along the rocker arm 26 toward the arm pivot pin 27. Adjacent the pin 27, the link 77 is pivotally attached to a triangular plate or bell crank 78 which is pivotally connected by a screw 79 to the rocker arm 26 adjacent its pivot pin 27 and which is provided with a pivotal connection 81 to the air cylinder piston rod 53.

Shortening of the normal angular stroke X of the rocker arm 26 to the reduced angular stroke Y is effected by pivoting the triangular plate 78 on its pivot screw 79 in a clockwise direction (as viewed in Fig. 6) to move the position of the pitman pivot screw 42 further away from the rocker arm pivot pin 27 to a position above from that shown in Fig. 6. This movement is effected through operation of the air cylinder 50 or other suitable device. The movement from normal to shortened stroke and return is limited by stop pins or lugs 82 on the rocker arm 26 on each side of the link 75.

In the form of the stroke shortening device shown in Fig. 7, the pivot screw 42 of the pitman 33 is secured to a bell crank lever 85 having a short leg extending toward and pivotally anchored to the rocker arm 26 by a pivot screw 86, and having a long leg extending down along the rocker arm to a point adjacent the arm pivot pin 27 where the leg is attached by a pivot screw 87 to the piston rod 53 of the air cylinder 50. Fig. 7 shows the bell crank 85 in its normal stroke position. When the bell crank 85 is rocked on its pin 86 in a clockwise direction as viewed in Fig. 7, the pivot screw 42 is raised above that shown in Fig. 7 to shorten the angular travel of the rocker arm 26. Stop pins or lugs 88, 89 on the rocker arm 26 limit the travel of the bell crank from normal to shortened strokes and return. Oscillation of the bell crank 85 on its pivot screw 86 through operation of the air cylinder 50 as in the other forms of the invention shifts the position of the pitman pivot screw 42 to change the throw of the rocker arm 26 from normal to shortened strokes as mentioned hereinbefore.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making tubular can bodies, the combination of a reciprocatory delivery feed mechanism including spring pressed feed dogs operating through a forward feed stroke and a rearward return stroke and engageable with the trailing ends of said bodies at the conclusion of the return stroke for normally propelling the bodies successively to a predetermined advanced position, a continuously operating receiving feed mechanism for picking up said positioned can bodies for further advancement thereof, and means responsive to abnormal feeding conditions for shortening the return stroke only of said feed dogs to prevent engagement thereby with the trailing ends of succeeding can bodies for further advancement thereof, while insuring full advancement of previously engaged bodies so that the foremost body remains in completely advanced position to be picked up by said receiving feed mechanism, without terminating the reciprocatory and continuous movement respectively of said delivery and receiving feed mechanisms.

2. In a machine for making tubular can bodies, the combination of a reciprocatory delivery feed mechanism including a pivoted rocker arm operating through a forward feed stroke and a rearward return stroke for advancing can bodies along a path of travel to a predetermined advanced position, said mechanism also including depressible feed dogs connected to said rocker arm and engageable with the trailing ends of said bodies at the conclusion of the return stroke of said rocker arm for so advancing said bodies, a continuous receiving feed mechanism for picking up said positioned can bodies for further advancement thereof, and means responsive to abnormal feeding conditions for shortening the return stroke of said rocker arm to prevent engagement of said said feed dogs with the trailing ends of said can bodies for further advancement thereof, while insuring full advancement of said bodies by said feed dogs so that the foremost body will be left in said predetermined advanced position to be picked up by said receiving mechanism, without necessitating shutting down operation of said reciprocatory and continuous feed mechanisms.

3. The combination defined in claim 1 wherein said delivery feed mechanism also includes a rocker arm for reciprocating said feed dogs and wherein said means responsive to abnormal feeding conditions includes means connected to said rocker arm for shortening the angular return travel thereof to shorten the return stroke of said feed dogs so that they will remain depressed while riding against said can bodies and will not clear the same to snap into propelling engagement with the trailing ends thereof.

4. The combination defined in claim 2 wherein said delivery feed mechanism includes means for rocking said rocker arm to reciprocate said delivery feed mechanism through its feeding and return strokes, and a pivotal connection between said arm and said rocking means, and wherein said means responsive to abnormal feeding conditions includes means for shifting said pivotal connection to shorten the return angular travel of said rocker arm to shorten the return stroke of said delivery feed mechanism.

5. The combination defined in claim 4 wherein said shifting means moves said pivotal connection on and relative to the pivotal axis of said rocker arm.

6. The combination defined in claim 2 having means for rocking said rocker arm to reciprocate said feed mechanism, a pivotal connection between said arm and said rocking means, and wherein said means responsive to abnormal feeding conditions includes means for shifting said pivotal connection relative to the pivotal mounting of said rocker arm to shorten the angular return stroke of said rocker arm and the return stroke of said feed mechanism for holding said feed dogs out of feeding engagement with the trailing ends of said can bodies.

7. The combination defined in claim 2 wherein said delivery feed mechanism includes a pitman connected to said rocker arm for rocking the same, and wherein said means responsive to abnormal feeding conditions includes a movable element connected to said rocker arm and to said pitman for effecting normal rocking movement of said arm, and means for shifting said movable element relative to the pivotal mounting of said rocker arm to shorten the angular return travel of the arm and the return stroke of said delivery feed mechanism.

8. The combination defined in claim 7 wherein said movable element comprises a slide operable adjacent said rocker arm toward and away from said pivotal mounting.

9. The combination defined in claim 7 wherein said movable element comprises part of a parallelogram link device pivotally attached to said rocker arm and movable toward and away from the pivotal mounting of said arm.

10. The combination defined in claim 7 wherein said movable element is a bell crank lever pivotally attached to said rocker arm and movable relative to said pivotal mounting for said arm.

11. The combination defined in claim 7 wherein said means for shifting said movable element is movable with said rocker arm.

12. The combination defined in claim 7 wherein said means for shifting said movable element is mounted on said rocker arm.

13. The combination defined in claim 7 wherein said means for shifting said movable element comprises a fluid pressure means operatively connected to said movable element.

14. The combination defined in claim 13 having detector devices operable by can bodies propelled by said delivery feed mechanism for controlling the operation of said fluid pressure means.

References Cited in the file of this patent

UNITED STATES PATENTS

| | | |
|---|---|---|
| 239,380 | Gotten | Mar. 29, 1881 |
| 1,336,108 | Trosch | Apr. 6, 1920 |
| 2,791,978 | Nordquist et al. | May 4, 1957 |